(12) United States Patent
Hausmann et al.

(10) Patent No.: US 6,870,420 B2
(45) Date of Patent: Mar. 22, 2005

(54) METHOD OF INCREASING AN INTERNAL OPERATING VOLTAGE FOR AN INTEGRATED CIRCUIT, AND INTEGRATED CIRCUIT

(75) Inventors: Michael Hausmann, Unterhaching (DE); Joachim Schnabel, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/429,577

(22) Filed: May 5, 2003

(65) Prior Publication Data

US 2003/0230758 A1 Dec. 18, 2003

(30) Foreign Application Priority Data

May 3, 2002 (DE) .......................................... 102 19 783

(51) Int. Cl.$^7$ .............................. G05F 1/10; G05F 3/02
(52) U.S. Cl. ...................................................... 327/536
(58) Field of Search ................................. 327/536, 589; 363/59–60; 365/226

(56) References Cited

U.S. PATENT DOCUMENTS 6,717,458 B1 * 4/2004 Potanin ...................... 327/536

* cited by examiner

*Primary Examiner*—Terry D. Cunningham
*Assistant Examiner*—Quan Tra
(74) *Attorney, Agent, or Firm*—Laurence A. Greenberg; Werner H. Stemer; Ralph E. Locher

(57) ABSTRACT

An increased internal operating voltage for an integrated circuit can be generated with two two-stage charge pumps, ensuring reliable operation even in the event of an external voltage supply Vext=1.8 V or less. The two charge pumps cooperate with a common first stage in a cyclic sequence. A temporally offset organization of the cycles of the two charge pumps enables operation in a manner that is free from disturbances. Moreover, the large chip area required for capacitors can advantageously be considerably reduced.

21 Claims, 3 Drawing Sheets

METHOD OF INCREASING AN INTERNAL OPERATING VOLTAGE FOR AN INTEGRATED CIRCUIT, AND INTEGRATED CIRCUIT

BACKGROUND OF THE INVENTION

FIELD OF THE INVENTION

The invention lies in the integrated technology field. More specifically, the invention pertains to a method for increasing the internal operating voltage for an integrated circuit. The existing external supply voltage is thereby transformed to the higher internal operating voltage by way of at least one two-stage charge pump by a procedure wherein a first capacitor and a second capacitor are precharged in a first phase and, in a second phase, the charge thereof is superimposed on the second capacitor in order to increase the voltage. The invention further pertains to an integrated circuit wherein the method may be implemented.

In integrated circuits, in particular in memory circuits such as DRAMs (Dynamic Random Access Memory) the problem may arise that the external supply voltage, which is often backed up by a buffer battery in dynamic memories, becomes too low and may fall below 1.8 V, for example. Reliable data protection of the DRAM can then no longer be ensured. Therefore, two-stage charge pumps known per se are generally used, by means of which the increased internal operating voltage can be generated. Customary voltages are in this case 2.8 to 3.0 V. The charge pumps, which are likewise formed on the memory chip as an integrated circuit, can transform a DC voltage to a higher value—analogously to transformer circuits in the transformation of an AC voltage. As essential elements, they generally have a plurality of capacitors, so-called pump capacitors, by means of which the DC voltage used can be stepped up to a higher value, for example twice the value of the external supply voltage, the magnitude of the usable current also having to be taken into account. Such pump capacitors are integrated on the chip area but—depending on their capacitance—require a relatively large amount of space from the available chip area, as a result of which the manufacturing costs for chip fabrication rise to an undesirable extent.

To date, this problem has often been circumvented by using external supply voltages of 2.5 V or more, for example, in commercially available dynamic memory circuits. Reliable functioning of the memory circuit has not been ensured at lower voltages.

In the course of the further development and further miniaturization of electronic devices and also in order to be able to utilize the capacity of the batteries even better, the problem arises that memory circuits, in particular, have to be operated reliably with even lower external supply voltages, for example with 1.8 V or less. At these low supply voltages, too, the stepped-up internal operating voltage is to attain values of 2.8 V or more with a sufficient current yield, without too much chip area having to be used for the two-stage charge pumps used. For the prior art two-stage charge pumps known to date, a disproportionately large chip area has been required, in an unfavorable manner, in order to be able to satisfy the requirements described above.

SUMMARY OF THE INVENTION

It is accordingly an object of the invention to provide a method for increasing the external supply voltage of an integrated circuit and an integrated circuit which overcome the above-mentioned disadvantages of the heretofore-known devices and methods of this general type and which increases the supply voltage and an integrated circuit which still operates reliably at particularly low supply voltages and at the same time requires as little chip area as possible.

With the foregoing and other objects in view there is provided, in accordance with the invention, a claim 1 method of increasing a supply voltage of an integrated circuit by transforming an external supply voltage of an integrated circuit to a relatively higher internal operating voltage, the method which comprises:

operating at least two two-stage charge pumps in parallel in a multiphase operation, the two-stage charge pumps having a first stage and a second stage, and having a first capacitor and a second capacitor, and thereby:
    precharging the first capacitor and the second capacitor in a first phase; and
    superimposing a charge of the first capacitor on the second capacitor for increasing the voltage in a second phase;
  and accessing a common first stage in a cyclic sequence with the two-stage charge pumps in the multiphase operation.

The novel method for increasing the external supply voltage of an integrated circuit and the integrated circuit, respectively, with these features have the advantage, as compared with the prior art, that the chip area required for the pump capacitors can be considerably reduced since both charge pumps can access the same first stage. In this case, it is regarded as particularly advantageous that, in a multiphase operation, the two charge pumps share the first stage without reciprocally influencing one another. This means that, in principle, the chip area for one stage of a charge pump can be dispensed with, and saved.

It is regarded as particularly advantageous that, in a four phase operation, firstly the first charge pump precharges the first capacitor in a phase 0 and, in a phase 1, superimposes this charge on the charge of a second capacitor of the second stage. By way of example, through a suitable choice of the capacitor areas on the chip, the output voltage at the second capacitor can be raised simply in this way to the value 4/3 of the external supply voltage.

In a phase 2, the first charge pump then advantageously transfers the entire charge to a third capacitor, which then forms the increased internal operating voltage.

It is favorable, moreover, that the first charge pump recharges its second capacitor in the phase 3 in order that the charge of the capacitor is available again in the next cycle.

A favorable solution is also seen in the fact that a sequence in a four phase operation similar to that carried out in the case of the first charge pump is carried out in the case of the second charge pump. In the phase 0, the second charge pump charges the abovementioned first capacitor and, in the phase 1, transfers the charge to its second capacitor. The second capacitor is preferably likewise charged to 4/3 Vext.

It is also advantageous that, in the phase 2, the second charge pump subsequently charges a third capacitor (output capacitor), so that the desired increased operating voltage can be produced.

Finally, in the phase 3, the second capacitor is charged again in order that it is prepared for the next cycle.

In order to ensure a disturbance-free sequence of the individual phases of the two two-stage charge pumps, a phase-offset operation of the two charge pumps is advantageously provided.

An advantageous phase-offset operation results if the first charge pump in the phase 0 and the second charge pump in the phase 2 operate at the same time. In these phases, the first charge pump charges the first capacitor and the second charge pump transfers the charge of its second capacitor to the third capacitor, so that no reciprocal impairment can occur.

It is also correspondingly favorable if, in the next cycle, the first charge pump operates in the phase 1 and the second charge pump operates in the phase 3.

For the last two cycles, a disturbance-free cooperation results if the first charge pump is in the phase 2 and 3, respectively, and the second charge pump is in the phase 0 and 1, respectively.

A favorable solution is also seen in the fact that the individual phases of the two charge pumps are formed such that they are of the same length of time. As a result, the two charge pumps can operate synchronously and can utilize the available phase time optimally for charging or transferring the capacitor charges.

The individual phases are advantageously changed over by means of MOSFET transistors since the latter can be fabricated and easily controlled using the same technology as the integrated circuit.

It is regarded as particularly advantageous that the charge pumps can be designed in particular for particularly low supply voltages, such as 1.8 V or less, and nevertheless require less chip area than comparable known charge pumps.

With just six switches it is advantageously possible to construct a simple control circuit to control the phases of the two charge pumps.

In the case of the integrated circuit, the advantage is afforded that memory circuits such as DRAMs can advantageously utilize these charge pumps.

Other features which are considered as characteristic for the invention are set forth in the appended claims.

Although the invention is illustrated and described herein as embodied in a method for increasing the internal operating voltage for an integrated circuit and integrated circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
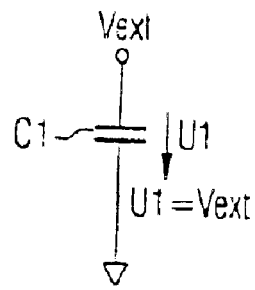
FIGS. 1A to 1D are schematic views illustrating a first two-stage charge pump according to the invention in its four phases 0 to 3.

Referring now to the figures of the drawing in detail and first, particularly, to FIGS. 1 and 2 thereof, the invention will be described with reference to the example of a four phase operation. The individual functional blocks of the two two-stage charge pumps A, B are illustrated initially in a highly simplified manner using FIGS. 1A to 1D for the first two-stage charge pump A and, respectively, using FIGS. 2A to 2D for the second charge pump B. The four phases are presented here only by way of example and their number may, of course, also be changed.

It is provided that, after the elapsing of the four phases which, from a temporal point of view, in each case proceed from top to bottom in accordance with FIGS. 1A . . . 1D and 2A . . . 2D, respectively, a new cycle begins again at the top. The speed for the cycles is dependent on the application and may be chosen accordingly. It also appears advantageous for the individual phases to be formed such that they are of the same length of time, thus resulting in simpler cyclic timing.

Firstly, the invention is explained for the first charge pump A, which is illustrated schematically in a simplified manner in FIGS. 1A to 1D. FIG. 1A shows the first stage of the two-stage charge pump A, which, moreover, also forms the identical first stage of the second two-stage charge pump B, as will be explained later.

An important component of the first stage of the charge pump A is a capacitor C1 (pump capacitor) which is precharged by an external supply voltage Vext, which is applied as a DC voltage and may be supplied by a battery, for example. A second capacitor CA of the charge pump A was also precharged. Consequently, in accordance with FIG. 1A, the capacitor C1 is charged to the voltage U1=Vext taking account of a corresponding time constant.

Figure 1B:
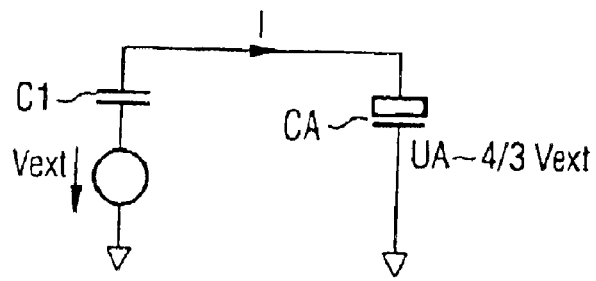

After the phase 0 has elapsed, FIG. 1B shows the phase 1 of the first charge pump A. What is used here as second stage is essentially a second capacitor CA connected in parallel with the first stage. Via non-illustrated switches, for example using MOSFET technology (metal oxide semiconductor field-effect transistor), the first capacitor C1 then interacts with the supply voltage Vext as voltage source, so that a charging current I can charge the second capacitor CA of this charge pump A. The output voltage UA increases at the second capacitor CA to the value UA~⁴⁄₃ Vext, for example. The increase in the voltage is essentially determined by the ratio of the capacitances of the two capacitors C1, CA and can be varied accordingly. By way of example, if CA is twice as large as C1, the above-mentioned value results after the charge has been transferred.

Figure 1C:
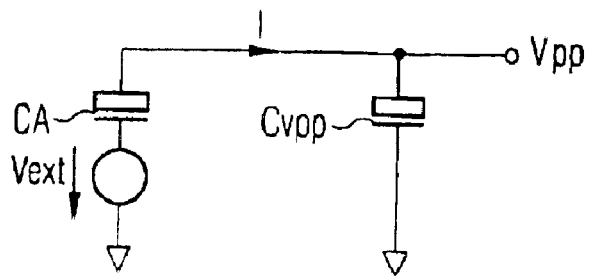
Figure 1D:
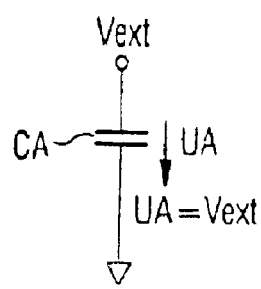

FIG. 1C shows phase 2 of the first charge pump A. Here, the second capacitor CA interacts with the voltage Vext again as source and charges an output capacitor Cvpp by means of the charging current I. Here, the desired increased operating voltage Vpp is then established, which can be tapped off at an output terminal of the output capacitor Cvpp. For an integrated circuit such as a DRAM, this voltage may lie in the range of from 2.5 to 3 V with a sufficient current yield. It is also possible for the supply voltage Vext to be less than 1.8 V. This applies, however, only if the second charge pump B also operates in a corresponding rhythm, as is explained below.

In phase 3, the second capacitor CA is precharged by the external supply voltage Vext again.

The construction and the method of operation of the second two-stage charge pump B are explained in more detail below with reference to FIGS. 2A to 2D.

The construction of the second charge pump B is of largely similar design to that described with respect to the first charge pump A. In the phase 0, the first capacitor C1 is charged in accordance with FIG. 2C, which capacitor has already been explained previously. This capacitor C1 forms the first stage for the second charge pump B as well.

Figure 2A:
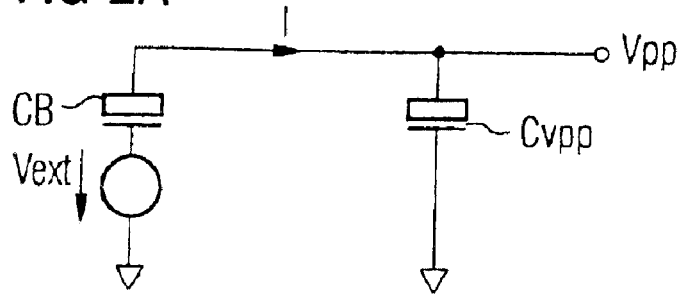
FIGS. 2A to 2D are schematic views illustrating a second two-stage charge pump in its four phases 0 to 3.
Figure 2B:
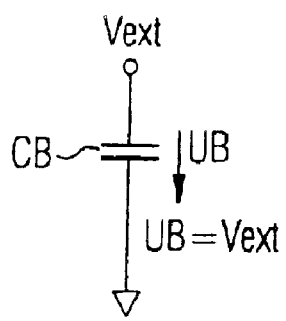
Figure 2C:
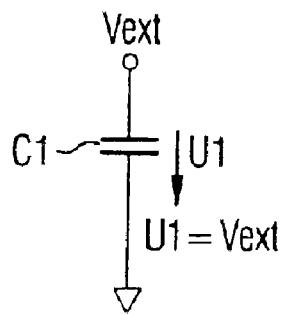
Figure 2D:
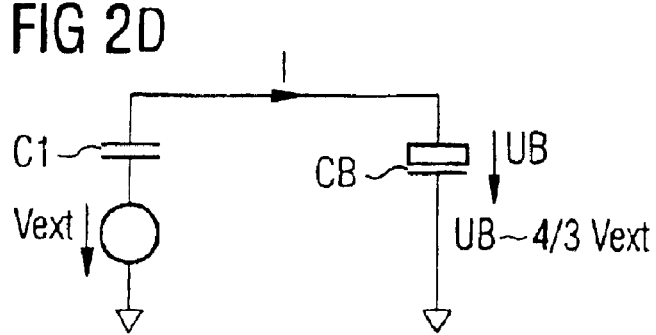

Afterward, in accordance with FIG. 2D, in the phase 1, the charge of the first capacitor C1 is transferred together with the supply voltage Vext to a second capacitor CB, which forms the second stage of the second charge pump B. This process has already been described in similar fashion with respect to FIG. 1b. Since the second capacitor CB has the same capacitance as CA, an output voltage UB~⅓ Vext is established here as well. A correspondingly changed voltage is established, of course, under different conditions.

In accordance with FIG. 2A, in a phase 2, the charge stored in the second capacitor CB is then transferred together with the supply voltage Vext to the output capacitor Cvpp described from the first charge pump, so that the usable increased operating voltage Vpp is also established here in this phase.

In FIG. 2B, the second capacitor CB is again precharged to the output voltage UB=Vext. In FIG. 2C, a new cycle then begins once more for the second charge pump.

A primarily important feature of the invention is that the two charge pumps A, B cooperate in parallel in a cyclic sequence, but in a phase-offset manner. While the charge pump A is in the phase 0 in accordance with FIG. 1A, the second charge pump B is in the phase 2 in accordance with FIG. 2A. During the next cycle, the first charge pump A changes to phase 1 in accordance with FIG. 1B and the second charge pump B changes to phase 3 in accordance with FIG. 2B.

As can be gathered from FIGS. 1C and 2C, the first charge pump A is then in the phase 2 and the second charge pump B is then in the phase 0. The same applies correspondingly to FIGS. 1D and 2D. Here, the two charge pumps A, B are in the phase 3 and in the phase 1, respectively, after which a new cycle begins again in accordance with FIGS. 1A and 2A.

By virtue of this phase-offset arrangement of the two charge pumps A, B by a phase angle of 180 degrees, it is ensured at every point in time that no reciprocal disturbances of the two charge pumps A, B can occur. The required chip area can nevertheless be significantly reduced compared with known solutions as a result of the joint utilization of the first stage.

Figure 3:
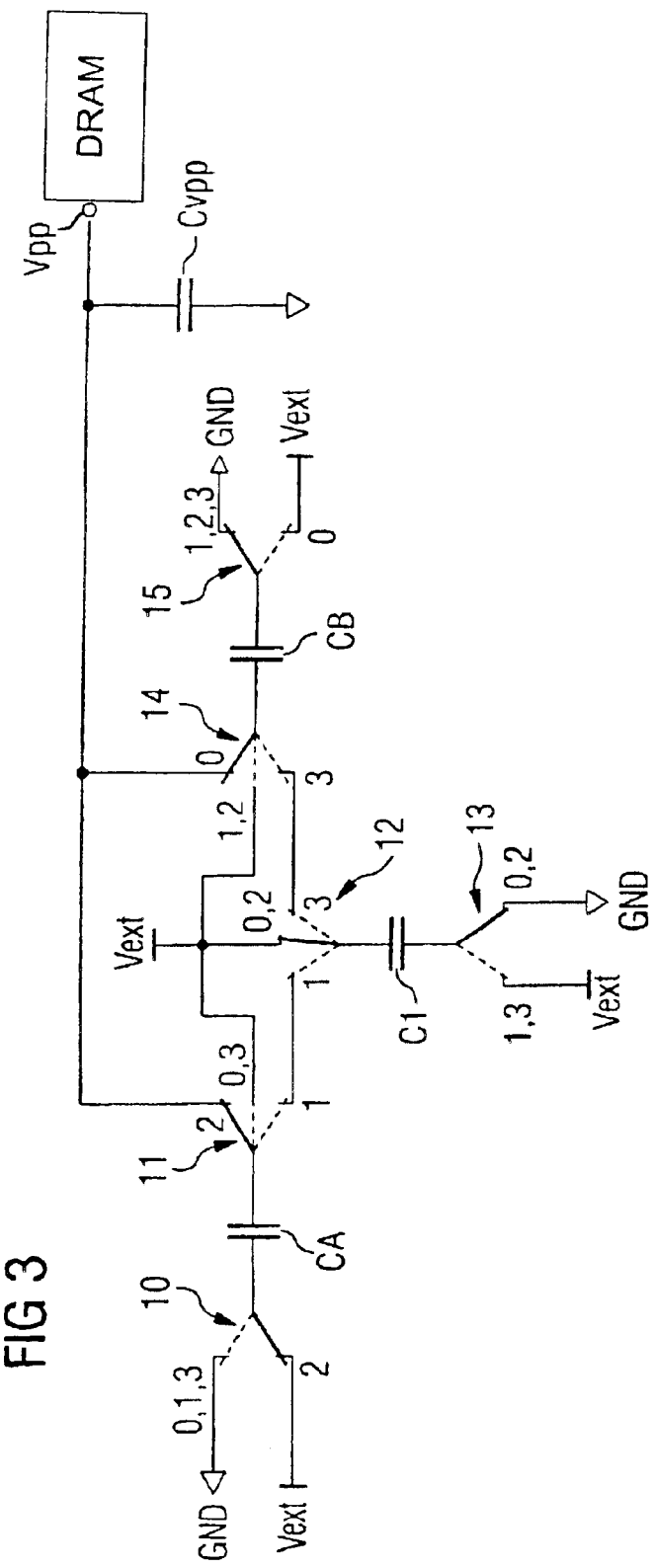
FIG. 3 is a schematic diagram of a control circuit according to the invention.
Figure 4:
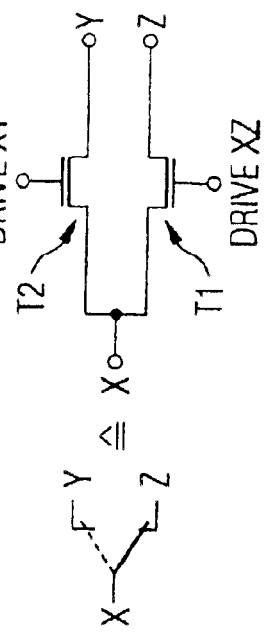
FIG. 4 is a schematic of an integrable switch.

FIG. 3 shows a control circuit in a schematic embodiment which can control the individual phases 0 . . . 3 of the two charge pumps A, B by means of six switches 10 . . . 15. The six switches 10 . . . 15 are designed as changeover switches and are designed in the realization in the integrated circuit in the form of switching transistors for example using NFET or PFET technology. The switches 11, 12 and 14 have three switching positions, while the switches 10, 13 and 15 have only two switching positions. An example is shown in FIG. 4 and will be explained later.

The capacitors C1, CA and Cvpp in FIG. 3 are the same as those described with reference to FIGS. 1 and 2. GND is the ground reference potential and Vext is the external supply voltage, and Vpp is the increased internal operating voltage available at the output of the control circuit. The different switching positions are identified by dashed lines and respectively, for differentiation, by a solid line. In this case, the numerals 0 to 3 represent the individual switching connections for the phases 0 to 3.

The method of operation of this arrangement is explained below from the standpoint of the charge pump A firstly for the phase 0 thereof. In accordance with the switch positions identified by 0, the capacitor CA is at GND, on the one hand, and is charged to Vext, on the other hand. The switches 10 and 11 are involved in this case. Furthermore, the capacitor C1 is charged to Vext via the switches 12, 13. Via the switches 14 and 15, the capacitor CB of the charge pump B transfers its charge to the output capacitor Cvpp in accordance with the description with respect to FIG. 2B.

Analogously, in phase 1, the switch 11 is changed over, while switch 10 remains in its position. The switches 12, 13, 14 and 15 are likewise changed over.

In phase 2, the switches 10, 11, 12 and 13 are changed over and the switches 14 and 15 remain in their previous switching position.

In phase 3, the switches 10, 11, 12, 13 and 14 are changed over again and the switch 15 remains unchanged.

The switching operations described above are repeated cyclically, so that the capacitors CA, C1, CB and Cvpp can be correspondingly charged and discharged.

FIG. 4 shows a two-pole changeover switch, as can be used for example in the switches 10, 13 and 15. The changeover switch has two switching transistors T1, T2 through which a switching current can flow between the terminals X, Y and X, Z, respectively, depending on which of the two control inputs Drive XY or Drive XZ is driven. In the case of a three-pole changeover switch, a third switching transistor is correspondingly connected in parallel. The switching transistors are preferably driven by a control logic formed in the integrated circuit.

We claim:

1. A method of increasing a supply voltage of an integrated circuit by transforming an external supply voltage of an integrated circuit to a relatively higher internal operating voltage, the method which comprises:
   operating at least two two-stage charge pumps in parallel in a multiphase operation, the two-stage charge pumps having a common first stage with a first capacitor and a second stage, each with a second capacitor, and thereby:
      precharging the first capacitor and the second capacitor in a first phase; and
      superimposing a charge of the first capacitor on the second capacitor for increasing the voltage in a second phase;
   and accessing the common first stage in a cyclic sequence with the two-stage charge pumps in the multiphase operation.

2. The method according to claim 1, which comprises precharging the first capacitor in a phase 0 with the first charge pump, and, in a phase 1, superimposing the charge of the first capacitor on the charge of the second capacitor of the second stage, for increasing an output voltage of the second capacitor to the relatively higher internal operating voltage.

3. The method according to claim 2, which comprises generating the internal operating voltage at a value of approximately ⅓ Vext, where Vext is the external supply voltage.

4. The method according to claim 2, which comprises, in a phase 2, transferring a charge of the second capacitor of the first charge pump to an output capacitor for generating the relatively higher internal operating voltage.

5. The method according to claim 4, which comprises recharging the second capacitor of the first charge pump in a phase 3.

6. The method according to claim 1, wherein the second charge pump precharges the first capacitor in a phase 0 and, in a phase 1, superimposes a charge of the first capacitor on a charge of a second capacitor thereof, for increasing an output voltage of the second capacitor.

7. The method according to claim 6, which comprise increasing the output voltage to a value of approximately ⅓ Vext, where Vext is the external supply voltage.

8. The method according to claim 6, which comprises, in a phase 2, transferring a charge of the second capacitor of the second charge pump to the output capacitor for generating the relatively higher internal operating voltage.

9. The method according to claim 8, which comprises recharging the second capacitor of the second charge pump to the external supply voltage in a phase 3.

10. The method according to claim 1, which comprises operating the two charge pumps with a phase offset.

11. The method according to claim 10, which comprises simultaneously operating the first charge pump in a phase 0 and the second charge pump in a phase 2 at the same time.

12. The method according to claim 10, which comprises simultaneously operating the first charge pump in a phase 1 and the second charge pump in a phase 3 at the same time.

13. The method according to claim 10, which comprises simultaneously operating the first charge pump in a phase 2 and the second charge pump in a phase 0 at the same time.

14. The method according to claim 10, which comprises simultaneously operating the first charge pump in a phase 3 and the second charge pump in a phase 1 at the same time.

15. The method according to claim 1, wherein a length of respectively assigned phases is of equal magnitude.

16. The method according to claim 1, which comprises switching between individual phases of the charge pumps with a controller.

17. The method according to claim 16, wherein the controller contains MOSFET switches.

18. The method according to claim 1, wherein the charge pumps are configured for receiving an external voltage supply of 1.8 V.

19. An integrated circuit, comprising:

an integrated memory circuit; and two two-stage charge pumps configured for carrying out the method according to claim 1 and for forming the internal operating voltage and for supplying the operating voltage to said integrated memory circuit.

20. The integrated circuit according to claim 19, which comprises a control circuit connected to said charge pumps, said control circuit having at least six switches for controlling individual phases of said two charge pumps.

21. The integrated circuit according to claim 19, wherein said memory circuit includes a DRAM.

\* \* \* \* \*